US010223312B2

(12) United States Patent
Sanghai et al.

(10) Patent No.: US 10,223,312 B2
(45) Date of Patent: Mar. 5, 2019

(54) QUALITY OF SERVICE ORDINAL MODIFICATION (71) Applicant: ANALOG DEVICES, INC., Norwood, MA (US)

(72) Inventors: Kaushal Sanghai, Somerville, MA (US); Robert E. Peloquin, Natick, MA (US); Thomas C. Ajamian, Needham, MA (US)

(73) Assignee: ANALOG DEVICES, INC., Norwood, MA (US)

( * ) Notice: Subject to any disclaimer, the term of this patent is extended or adjusted under 35 U.S.C. 154(b) by 136 days.

(21) Appl. No.: 15/297,115

(22) Filed: Oct. 18, 2016

(65) Prior Publication Data
US 2018/0107621 A1 Apr. 19, 2018

(51) Int. Cl.
G06F 13/18 (2006.01)
G06F 13/364 (2006.01)
G06F 13/16 (2006.01)
G06F 13/24 (2006.01)
G06F 13/42 (2006.01)

(52) U.S. Cl.
CPC ........ G06F 13/364 (2013.01); G06F 13/1605 (2013.01); G06F 13/18 (2013.01); G06F 13/24 (2013.01); G06F 13/4282 (2013.01); G06F 2213/36 (2013.01)

(58) Field of Classification Search
CPC .... G06F 13/18; G06F 13/364; G06F 13/0613; G06F 13/4022; G06F 13/24; G06F 13/4282; G06F 13/1605; G06F 2213/36
See application file for complete search history.

(56) References Cited

U.S. PATENT DOCUMENTS

| 6,088,751 | A | 7/2000 | Jaramillo |
| 7,007,122 | B2 | 2/2006 | Solomon et al. |
| 7,373,445 | B2 | 5/2008 | Hellwig et al. |
| 2007/0101031 | A1* | 5/2007 | Fujiwara ............... G06F 13/364 710/113 |

(Continued)

FOREIGN PATENT DOCUMENTS

EP 0518504 5/1992

OTHER PUBLICATIONS

Ashley Stevens, QoS for High Performance and Power-Efficient HD Multimedia, CoreLink Intelligent System IP by ARM, White Paper, ARM, Apr. 2010, 20 pages.

Primary Examiner — Ernest Unelus
(74) Attorney, Agent, or Firm — Patent Capital Group (57) ABSTRACT In an example, there is disclosed a computing apparatus, having: a first master having a first ordinal quality of service (QoS) profile; a second master having a second ordinal QoS profile, wherein the second ordinal QoS profile is higher in order than the first ordinal QoS profile; a slave; a multiplexed interconnect to communicatively couple the first master and second master to the slave with a priority according to the ordinal QoS profiles; and one or more logic elements, including at least one hardware logic element, providing a QoS engine to: determine that the first master has initiated a slave operation via the interconnect; determine that completing the slave operation according to a QoS criterion provided by the second master requires elevated QoS; and promote the first master to a third ordinal QoS profile having an order higher than the second ordinal QoS profile.

19 Claims, 6 Drawing Sheets (56) References Cited

U.S. PATENT DOCUMENTS

| | | | |
|---|---|---|---|
| 2010/0169525 A1* | 7/2010 | Natanel | G06F 13/362 710/110 |
| 2010/0199010 A1* | 8/2010 | Goren | G06F 13/364 710/244 |
| 2012/0246368 A1* | 9/2012 | Kwon | G06F 13/3625 710/110 |
| 2014/0281081 A1 | 9/2014 | Lunadier et al. | |
| 2014/0372648 A1 | 12/2014 | Langadi | |

* cited by examiner

QUALITY OF SERVICE ORDINAL MODIFICATION

TECHNICAL FIELD OF THE DISCLOSURE

This disclosure relates in general to the field of computing, and more particularly, though not exclusively to, a system and method for quality of service ordinal modification.

BACKGROUND

A computing system like a system-on-a-chip (SoC) may have a plurality of masters that need to access system resources, such as L2 memory (or a plurality of resources, such as L2 and L3 memories). An interconnect, such as a network-on-a-chip (NOC), may couple the masters to the resource. Each master may be assigned a priority, which controls priority of access to the NOC and the resource.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

DESCRIPTION OF EXAMPLE EMBODIMENTS OF THE DISCLOSURE

In an example, there is disclosed a computing apparatus, having: a first master having a first ordinal quality of service (QoS) profile; a second master having a second ordinal QoS profile, wherein the second ordinal QoS profile is higher in order than the first ordinal QoS profile; a slave; a multiplexed interconnect to communicatively couple the first master and second master to the slave with a priority according to the ordinal QoS profiles; and one or more logic elements, including at least one hardware logic element, providing a QoS engine to: determine that the first master has initiated a slave operation via the interconnect; determine that completing the slave operation according to a QoS criterion provided by the second master requires elevated QoS; and promote the first master to a third ordinal QoS profile having an order higher than the second ordinal QoS profile.

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

In an example embedded system-on-a-chip (SoC), there are many masters in a system, including for example one or more each of central processing units (CPUs), digital signal processors (DSPs), graphical processing units (GPUs), direct memory access (DMA), and peripherals such as high speed serial ports, Ethernet, USB, sensors, and electromechanical interfaces, by way of nonlimiting example. These masters may communicate with slaves and memories over an interconnect network such as a Network-on-a-chip (NOC).

As a design consideration, the masters have different Quality-of-Service (QoS) needs such as latency and bandwidth requirements. The NOC may provide many different transaction attributes to address these QoS needs. For example, the attributes can include priority assignments, outstanding transaction regulation, bandwidth regulation, maximum latency, priority levels, outstanding transaction values, or other factors. Each master may have an assigned QoS profile, which is a synthesis of its transactional needs and priorities. The QoS profiles of the various masters are ordinal in the sense that for every transaction, the NOC controller must decide which master gets priority for current access to the NOC.

In a traditional priority scheme, each master is assigned a single-number ordinal priority. For example, the CPU is priority 0, the DSP is priority 1, the GPU is priority 2, and so on. The higher-priority master always trumps the lower-priority master. While such schemes are wholly compatible with the teachings of the present specification, they are not limiting. Other factors may also be introduced to increase "fairness" and efficiency, or to limit the effect of a bandwidth hungry master on the system. For example, a master may have a minimum latency requirements, which can prevent higher-priority masters from monopolizing the interconnect. If a lower-priority master has been waiting sufficiently long for access, it may temporarily trump higher-priority masters and gain access to the interconnect. Many other factors may affect priority queuing transaction arbitration, ordering, or flow control. Thus, when this specification speaks of an ordinal QoS profile, the ordinal aspect may not be a simple ranking that is always followed. Rather, the ordinal priority of a master may change contextually with time. As used throughout this specification, the term "ordinal QoS profile" should be broadly understood to encompass any priority, queuing, or decision structure that enables a controller to make decisions about which master to grant access to a limited resource. The "ordinal" aspect (or in other words, the "order" of the profile) may include a static ordinal priority or a dynamic, contextual, or instantaneous ordinal priority, as appropriate to a particular embodiment.

In that context, it should also be understood that "elevating" or "promoting" an ordinal QoS profile is not limited to merely changing a single priority number. Rather, this can include any action that moves one master's request further forward in the queue, or otherwise ensures or increases the likelihood that it will be handled sooner than it would have been without the elevation or promotion. Also note that in some cases, elevating or promoting one master may be accomplished by lowering or demoting a different master.

The design and implementation of QoS profiles can have a significant impact on the system level performance of an SoC. For example, in some existing systems, controls for QoS profiles reside in the NOC, and give certain masters the ability to program them either at initialization or later in the application runtime.

However, there are challenges to determining an optimal or even acceptable set of QoS profiles for a complex interconnect network, either a priori or at runtime. A system may also provide a mechanism for automatically modifying QoS profiles at runtime based on the behavior of the system.

Consider, for example, an SoC where one or more masters is a DSP core and one or more masters is a DMA. The SoC also includes a NOC and memory hierarchy with multiple levels, such as L1 and L2. Consider an application scenario where the DSP core is processing data transferred by the DMA from a L2 and L3 memory to the core L1 memory.

Application software running on the core attempts to minimize or eliminate the times when the core is waiting on DMA data transfers, but the software is limited by the non-deterministic behavior of the DMA transfer because of the dynamic nature of system traffic. Thus, at times it is possible that the core is waiting on a DMA transfer to complete but it in turn it is held up due to other system traffic.

Different masters may have different latency requirements. For example, in a latency-sensitive master, the performance of the master is directly impacted by memory latency—the longer the memory latency, the lower the performance. In a latency-critical master, a specific maximum acceptable latency may be specified for each individual transaction, and if that latency is not achieved a catastrophic failure results (e.g., breakup of a video stream or clicks/pops/pauses in the audio). But as long as that minimum requirement is met, reducing latency further may not improve improvement performance. A bandwidth hog master is a node that has high bandwidth requirements and flow control, meaning that increased latency response will not result in a critical failure This is a situation where a latency-sensitive master (e.g., a DSP core) is waiting on completion of a non-deterministic operation of a different master (e.g., a DMA). By way of specific illustration, a first master (here the DMA) has a first ordinal QoS profile. A second master (here, the DSP core) has a second ordinal QoS profile. The second ordinal QoS profile is of a higher order (or conversely, a lower integer value) than the second ordinal QoS profile, e.g., the DSP has an ordinal priority of 1, while the DMA has an ordinal priority of 3. In the meantime, a GPU may have a third ordinal QoS profile, in this case with an ordinal priority of 2.

The result is that the DSP, with an ordinal priority of 1, has to wait on the GPU, with an ordinal priority of 2, because the DSP needs data from the DMA, which has an ordinal priority of 3.

In this case, it would be useful for the DMA to "inherit" the higher priority of the DSP. For example, the DMA could receive an ordinal QoS profile with a priority of 2. In certain embodiments, this will be sufficient to ensure priority over the GPU, because the DMA's request may be older, and race conditions between masters of the same order are resolved in favor of the oldest. Advantageously, this will also ensure that the DMA does not interfere with any operations that the DSP itself may need to perform in the meantime.

Alternatively, it may be desirable to require that the DMA gain absolute priority over the GPU, regardless of request age. In that case, the DMA may receive an ordinal priority of 1 or 0, thus ensuring priority over the DMA or even over the DSP.

Note that an nonnegative, integer priority marker is an example of only one of many possible fields in a QoS profile that could be modified to ensure that a request gets "inherited" priority from a higher-order master. Any other field within a QoS profile could be modified to effect the desired priority. For example, the maximum queue size for requests from the master could be adjusted downward, even to zero, to ensure immediate handling of its next-pending request. The maximum allowed latency for that master could also be adjusted downward, to as low as zero, to ensure that priority is achieved. In another example, flags could be used, such as "ABSOLUTE_PRIORITY." When this flag is set, the master always receives priority over masters of the same order, regardless of other QoS profile factors (conceptually, this is somewhat like the master getting a priority of 1.5—lower than all priority 1 masters, but higher than all priority 2 masters). Thus, a combination of priority 0 with an ABSOLUTE_PRIORITY flag could be used to force the interconnect to service that master on the next available cycle. Many other QoS factors could be adjusted, and are intended to fall within the scope of this disclosure.

In a general case, the system may be said to include a QoS engine, which may have several logical functions, including by way of nonlimiting example:

a. an ability for one or more masters to automatically detect conditions that will benefit from adjustments to the QoS profile scheme, including ordinal priority elevation, including the optional ability to notify other masters of the need to do so. For example, a first lower-priority master (e.g., the DMA) may signal to a second higher-priority master that it needs elevated priority to meet QoS parameters;

b. an ability to automatically identify dependency between the second master (e.g., the DSP) and the first master (e.g., the DMA), and determine that a higher-order master is being forced to wait on a lower-order master, or that it is appropriate for the lower-order master to inherit the priority of the higher-order master; and c. an ability to elevate the first master to a higher ordinal priority.

The QoS engine may be embodied partly in one of the masters, such as a master that has sufficient system privileges to overwrite priority (e.g., the CPU or DSP), and may be aided by logic encoded as microcode instructions, instructions in a ROM, encoded in special-purpose hardware, or encoded in some other non-transitory computer-readable storage medium. In other embodiments, the QoS engine may be a separate hardware block that monitors the masters and performs the ordinal priority elevation as needed. In that case, the QoS hardware engine may be designed to have all of the privileges necessary to effect ordinal privilege elevation.

Advantageously, certain embodiments optionally achieve ordinal priority elevation without making any changes to the NOC itself. This can be important in embodiments wherein the NOC is provided separately as an "IP block." In semiconductor design, third parties may provide IP blocks as black boxes, and the system designer may have little or no control over the block outside of its placement and routing.

Thus, in embodiments where a black box NOC is used, ordinal priority adjustments can still be realized.

Many different mechanisms may be used for adjusting ordinal priority. For example, ordinal priority may be controlled or adjusted by special purpose registers or buffers. In that case, the original QoS profile is stored in the buffer or register. When ordinal priority elevation is required, the QoS profile for the affected master may be temporarily altered. In another embodiment, an out-of-band (OOB) signaling bus, which may include one or more wires, may be provided to signal the need for an ordinal priority elevation or other change to a QoS profile. In yet another example, an in-band adjustment signal may be sent to the NOC. In yet another example, an interrupt may be triggered to notify the NOC that a QoS profile change is needed. In yet another example, a master may have permission to change its own QoS profile. QoS profile changes may also apply just to the master in question, to other masters in the system, or the NOC itself. In yet another embodiment, QoS profiles may include one or more programmable values that may be set by application software. In some embodiments, the QoS profile may be reset to its default value before the start of the next transfer. To further expand on the signaling mechanism, there could be many different ways to signal the modifications to the transaction attributes. In another example, the first master sends a signal to a trigger unit that triggers modifications to one or more QoS profile registers in the second master. The new QoS profile can either reside in the second master itself (as a set of registers), or may be part of memory descriptor that gets loaded for a given data transfer to provide greater application control to the user.

Another aspect of the QoS engine is logic to determine when it is appropriate to provide ordinal priority elevation. This could include, for example, explicit logic wherein the DSP, for example, may expressly elevate the ordinal priority of the DMA upon retiring an instruction that will result in a DMA operation, where timing is sensitive and will be dependent upon DMA access to the NOC. In another example, the QoS engine may include a heuristic engine that independently monitors all masters. The QoS engine may determine that the DSP has issued an instruction that is dependent on the DMA, and that completion of the instruction is in danger of not being fulfilled within a latency threshold that may be part of the QoS profile for the DSP. In that case, after waiting a sufficient time, (e.g., ¾ of the maximum latency), the QoS engine may immediately elevate the ordinal priority of the DMA, optionally to a maximum or other optimal value, to ensure that the DSP request is fulfilled within the latency threshold. This latter method has the advantage that adjustments to the QoS scheme may be minimized, and are made only when a timing-critical function is in danger of not being fulfilled. In some embodiments, a user or programmer may have application-level visibility into the scheme, enabling the programmer to tag certain operations as timing-critical, and to optionally explicitly set latency thresholds for those operations, or even explicitly elevate the ordinal priority of the DMA in connection with a specific command.

A system and method for ordinal QoS elevation will now be described with more particular reference to the attached FIGURES. It should be noted that throughout the FIGURES, certain reference numerals may be repeated to indicate that a particular device or block is wholly or substantially consistent across the FIGURES. This is not, however, intended to imply any particular relationship between the various embodiments disclosed. In certain examples, a genus of elements may be referred to by a particular reference numeral ("widget 10"), while individual species or examples of the genus may be referred to by a hyphenated numeral ("first specific widget 10-1" and "second specific widget 10-2").

Figure 1:
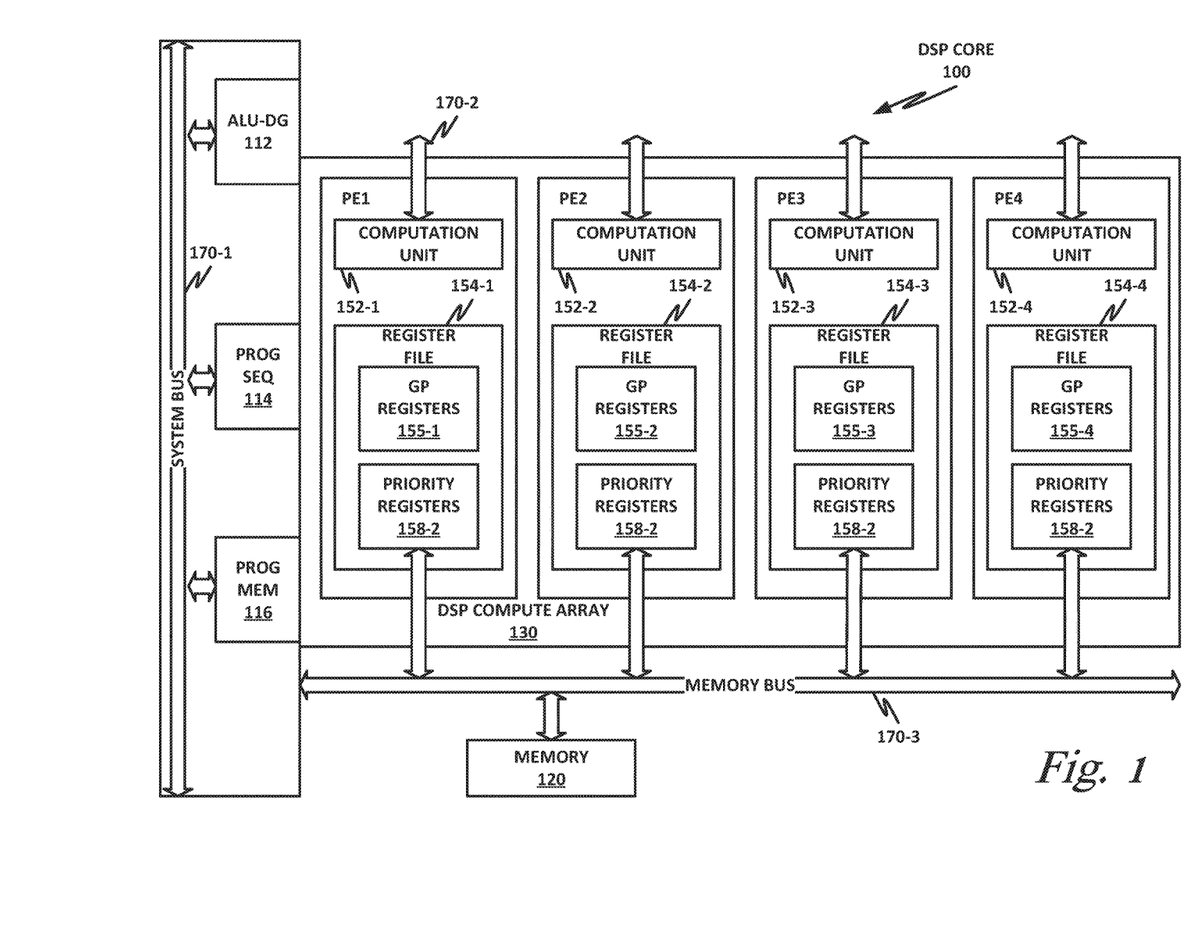
FIG. 1 is a block diagram of a digital signal processor according to one or more examples of the present specification.

FIG. 1 is a schematic block diagram of an example digital signal processor (DSP) core 100 according to one or more examples of the present specification. It should be noted that DSP core 100 is provided as one non-limiting example of a type of processor, and the term "processor" as used throughout this specification is intended to broadly encompass any combination of hardware, software, or firmware providing programmable logic, including by way of non-limiting example a microprocessor, digital signal processor, field-programmable gate array, programmable logic array, application-specific integrated circuit, or virtual machine processor. DSP core 100 may form part of a larger "computing device," which in various embodiments may include or be part of, by way of non-limiting example, a computer, embedded computer, embedded controller, embedded sensor, personal digital assistant (PDA), laptop computer, cellular telephone, IP telephone, smart phone, tablet computer, handheld calculator, or any other electronic, microelectronic, or microelectromechanical device for processing and communicating data. FIG. 1 has been simplified for the sake of clarity and to better understand the novel concepts of the present disclosure. Thus, additional features may be added in DSP core 100, and some of the features described below may be replaced or eliminated in other embodiments of DSP core 100.

DSP core 100 may include a control unit 110, a memory 120, and a compute array 130. In an example, control unit 110 and compute array 130 constitute a core processor that can perform computation and data processing functions of DSP core 100. Some embodiments of DSP core 100 include other components, such as a microcontroller for executing microcontroller instructions, a direct memory access (DMA) unit, and various interfaces to off-chip devices. Further, although memory 120 is shown here as a single logical block, it should be recognized that memory 120 may include system main memory, various levels of on-chip or local memory, cache, and/or other volatile or non-volatile memory technologies.

Control unit 110 facilitates program execution of DSP core 100. Control unit 110 may include an arithmetic logic unit and data address generation (ALU-DAG) unit 112, a program sequencer 114, and a local program memory 116. Control unit 110 may also include other components, such as an instruction cache, a timer, and an instruction register. In an example, ALU-DAG unit 112 supports general purpose integer computations and supplies memory addresses. For example, ALU-DAG 112 provides memory addresses when data are transferred between memory 120 and registers (such as register files of compute array 130, described below). ALU-DAG unit 112 can supply addresses to data memory (for example, memory 120) and/or program memory 116. Program sequencer 114 provides instruction addresses to program memory 116 for instruction fetches. Program memory 116 stores programs that DSP core 100 implements to process data (such as data stored in memory 120) and can also store process data. "Programs," as used throughout this specification, include any ordered set of executable instructions operable to instruct a processor, such as DSP core 100, to perform a specified task. DSP core 100 may implement programs by fetching the instructions, for example by retrieving them from memory 120 and loading them into program sequencer 114, decoding the instructions, and providing the decoded instructions to processing elements PE for execution, or executing them locally in ALU-DAG unit 112. In an example, programs may include instruction sets for implementing various DSP algorithms, including algorithms that may be performed in parallel by executing them across two or more processing elements PE, or in single-instruction-multiple-data (SIMD) mode, in which two or more processing elements execute the same instruction, as received from program sequencer 114, on different data elements. SIMD is commonly used, for example, for expeditious processing of large data arrays by dividing the array into n subarrays, and then allowing n processing elements to separately process one subarray each.

Memory 120 stores data to be processed by DSP core 100 (data memory), programs implemented by DSP core 100 to process the data (program memory), or a combination thereof. In some examples, memory 120 may have a multi-banked interleaved memory structure, such that memory 120 includes memory banks M1-Mn, where n is a total number of memory banks of memory 120. In an example, memory 120 is a random access memory, such as a static random-access memory (SRAM), dynamic RAM (DRAM), read-only memory (ROM), flash memory, or other suitable memory technology. In an example, one or more memory banks M are a separate RAM. Alternatively, memory 120 may represent a multi-tiered memory structure, including for example a fast L1 memory, an intermediate L2 memory, and a slow main memory, wherein the size and cost of each memory may vary inversely with the access speed of the memory. In yet another example, memory 120 may include a cache, or any other suitable type of memory. In some cases, a direct memory access (DMA) controller may also be provided to enable DMA operations from DSP core 100 to memory 120.

By way of example, three buses 170 are shown. As used throughout this specification, a "bus" includes any interconnection line, network, connection, bundle, single bus, multiple buses, crossbar network, single-stage network, multistage network or other conduction medium operable to carry data between parts of a computing device, or between computing devices. Where necessary or appropriate, buses 170 may also include appropriate controllers, such as a memory management unit (MMU) or similar. In this example, a main system bus 170-1 is provided to communicatively couple DSP core 100 to other system components, as discussed by way of more detailed example in FIG. 2. Computational bus 170-2 communicatively couples compute array 130 to control unit 110. Memory bus 170-3 communicatively couples processing elements PE to memory 120. It should be noted that these uses are disclosed by way of non-limiting example only, and that some embodiments may omit one or more of the foregoing buses, while others may employ additional or different buses.

Control unit 110 may issue instructions and data addresses to compute array 130 via computational bus 170-2. Computational bus 170-2 transfers addresses for instructions and data to various processing elements PE of compute array 130. Memory bus 170-3 may transfer data and/or instructions from memory (such as memory 120, program memory 116, other memory, or a combination thereof), such that contents of any register in DSP core 100 can be transferred to any other register or to any memory location and memory 120 can provide data operands (values) to compute array 130.

In the example shown, compute array 130 includes four processing elements PE1-PE4. In other embodiments, compute array 130 may include zero or more discrete processing elements. Processing elements PE perform numeric processing, and in an example may include specialized hardware for carrying out specific types of computations such as DSP algorithms. Processing elements PE may operate independently, in parallel, or as a SIMD engine. In the present example, each processing element PE may be a vector processor. Alternatively, processing elements PE may be scalar processors, or a combination of scalar processors and vector processors.

Processing elements PE each include a respective computation unit (CU) 152. In the depicted embodiment, computation units 152 may be identical, although the present disclosure contemplates embodiments where computation units 152 are not identical. The present disclosure further contemplates configurations where one or more processing elements PE do not include a computation unit 152. In the present example, computation units 152 each include an arithmetic logic unit (ALU), a multiplier-accumulator (MAC), a shifter, other computational unit, or combinations thereof. An ALU can perform arithmetic and logic operations, such as add, subtract, negate, increment, decrement, absolute value, AND, OR, EXCLUSIVE OR, NOT, divide primitive, other arithmetic operations, other logic operations, or combinations thereof. An example MAC can perform multiplication operations as well as multiply and accumulate operations, such as single-cycle multiply, multiply/add, multiply/subtract, other operations, or combinations thereof. A shifter can perform logical and arithmetic shifts, bit manipulations, normalization, denormalization, derive-exponent operations, other operations, or combinations thereof. The various arithmetic operations, logic operations, and other operations can be performed on both fixed-point and floating-point formats. In various embodiments, the ALU, MAC, and/or shifter include registers associated therewith.

Processing elements PE may also each include a respective register file 154. In the depicted embodiment, register files 154 may be identical, although the present disclosure contemplates embodiments where register files 154 are not identical. The present disclosure further contemplates configurations where one or more processing elements PE do not include a register file 154. Register files 154 include registers that transfer data between processing elements PE and memory bus 170-3 and stores results. In the present example, register files 154 can include a respective general purpose register set 155 that include general purpose registers having widths dependent on design requirements of DSP core 100, such as 32-bit general purposes registers, 40-bit general purpose registers, 64-bit general purpose registers, 128-bit general purposes registers, other width general purpose registers, or a combination thereof. For purposes of the following discussion, general purpose registers 155 include 32-bit general purpose registers.

In the present example, register files 154 may also include special-purpose registers 158. In particular, a QoS profile register may be provided. Note that special-purpose registers 158 may be general purpose registers that have been appropriated for the special purpose, and thus need not comprise special hardware. Rather, their "special purpose" is defined in terms of their role, namely their role in providing QoS ordinal elevation according to the methods disclosed herein.

In one example, a special purpose register 158 is designated as a QoS profile register. A high-priority master (e.g., the processor or DSP of FIG. 3) may write to special purpose register 158, with a value that indicates, for example, which master has been assigned a temporary elevated QoS profile, and a value that represents the temporary elevated QoS profile. Note that the QoS profile may be, in one example, a simple ordinal integer from 0 . . . n, wherein lower-numbered values have higher priority. This should be treated as a non-limiting example, however. Indeed, the QoS profile may be a multi-dimensional profile, with many different factors that can affect ordering, such as NOC congestion, the latency of currently pending requests, a maximum allowable latency, or any other factor that may enable a selector (e.g., selector 304 of FIG. 3) to select between multiple masters. Thus, the ordinal elevation discussed in this specification should be understood to include any schema wherein different masters receive ordinal priority, including schema where the priority is contextual or otherwise variable.

DSP core 100 can perform various parallel operations. For example, during a single cycle, processing elements PE may access an instruction (via interconnection network 142) and access N data operands from memory (via memory bus 170-3) for synchronous processing. In SIMD mode, DSP core 100 may process multiple data streams in parallel. For example, when in SIMD mode, DSP core 100 in a single cycle may dispatch a single instruction to each or a plurality of processing elements PE via computational bus 170-2; load N data sets from memory (memory 120, program memory 116, other memory, or a combination thereof) via memory bus 170-3, one data set for each processing element PE (in an example, each data set may include two data operands); execute the single instruction synchronously in processing elements PE; and store data results from the synchronous execution in memory 120.

Figure 2:
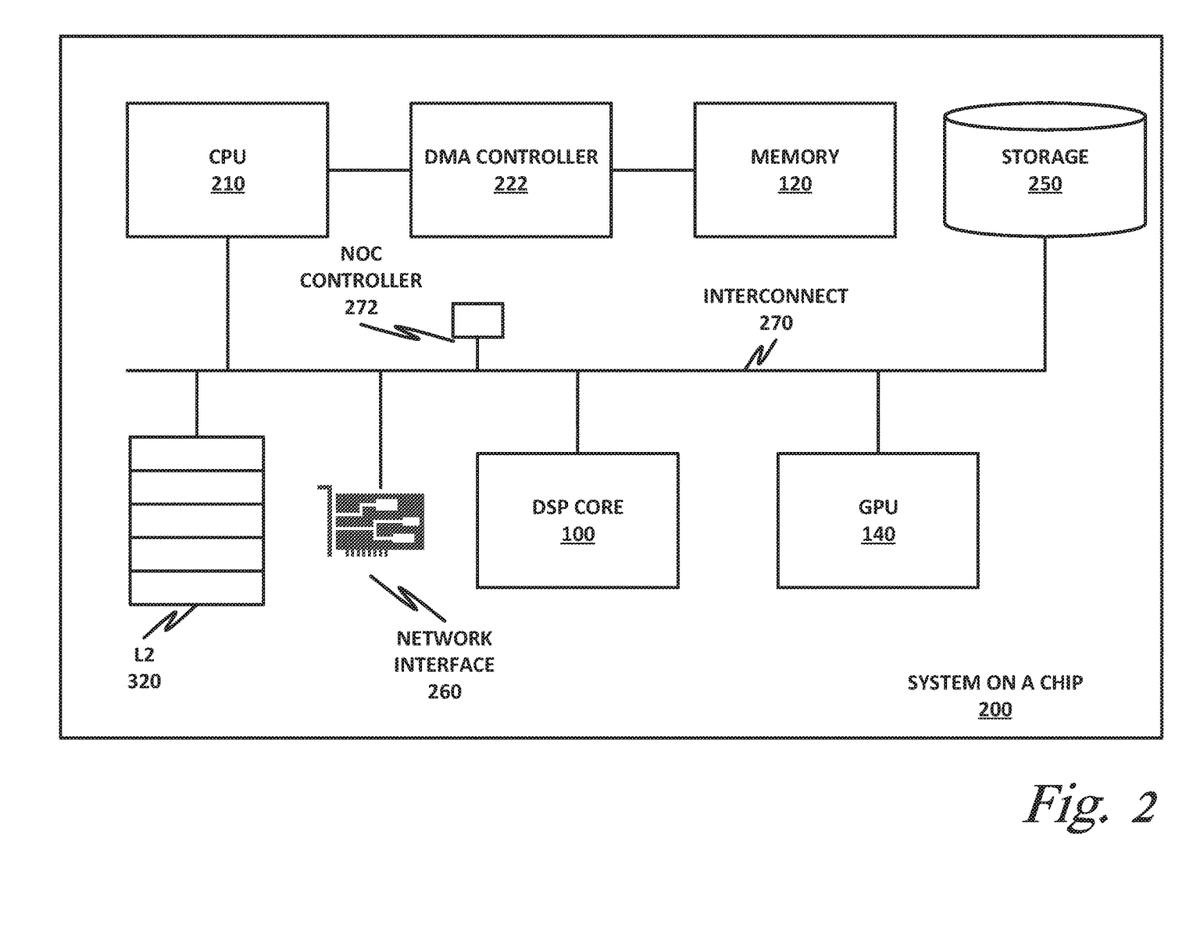
FIG. 2 is a block diagram of a system on a chip according to one or more examples of the present specification.

FIG. 2 is a block diagram of a system on a chip 200 according to one or more examples of the present specification. Note that system on a chip (SoC) 200 is provided herein by way of illustrative example only. In a general case, SoC 200 may be any suitable computing device. In various embodiments, a "computing device" may be or comprise, by way of non-limiting example, a computer, workstation, server, mainframe, virtual machine (whether emulated or on a "bare-metal" hypervisor), embedded computer, embedded controller, embedded sensor, personal digital assistant, laptop computer, cellular telephone, IP telephone, smart phone, tablet computer, convertible tablet computer, computing appliance, network appliance, receiver, wearable computer, handheld calculator, or any other electronic, microelectronic, or micro-electromechanical device for processing and communicating data.

SoC 200 includes a processor 210 connected to a memory 120 via DMA controller 222. Other components of SoC 200 include a DSP core 100, a graphical processing unit (GPU) 140, storage 250, and network interface 260. This architecture is provided by way of example only, and is intended to be non-exclusive and non-limiting. Furthermore, the various parts disclosed are intended to be logical divisions only, and need not necessarily represent physically separate hardware and/or software components. For example, certain computing devices provide main memory 220 and storage 250 in a single physical memory device, and in other cases, memory 220 and/or storage 250 are functionally distributed across many physical devices. In the case of virtual machines or hypervisors, all or part of a function may be provided in the form of software or firmware running over a virtualization layer to provide the disclosed logical function. In other examples, a device such as a network interface 260 may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, microcode, programmable logic, or objects that can coordinate to achieve a logical operation.

In an example, processor 210 is communicatively coupled to memory 220 via DMA controller 222, though many other memory architectures are possible, including ones in which memory 220 communicates with processor 210 via a system bus or some other bus. Processor 210 may be communicatively coupled to other devices via interconnect 270, which may be for example a network-on-a-chip (NOC) or any other suitable bus. As used throughout this specification, a "bus" includes any wired or wireless interconnection line, network, connection, bundle, single bus, multiple buses, crossbar network, single-stage network, multistage network or other conduction medium operable to carry data, signals, or power between parts of a computing device, or between computing devices. It should be noted that these uses are disclosed by way of non-limiting example only, and that some embodiments may omit one or more of the foregoing buses, while others may employ additional or different buses.

Interconnect 270 may be controlled by a NOC controller 272, which may assign ordinal priority to the various masters and route data according to that priority.

In various examples, a "processor" may include any combination of logic elements operable to execute instructions, whether loaded from memory, or implemented directly in hardware, including by way of non-limiting example a microprocessor, digital signal processor, field-programmable gate array, graphics processing unit, programmable logic array, application-specific integrated circuit, or virtual machine processor. In certain architectures, a multi-core processor may be provided, in which case processor 210 may be treated as only one core of a multi-core processor, or may be treated as the entire multi-core processor, as appropriate. In some embodiments, one or more co-processor may also be provided for specialized or support functions. Similarly, DSP core 100 may be a single core with SIMD capability, or may be multiple cores, each with SIMD capability.

Processor 210 may be connected to memory 220 in a DMA configuration via DMA controller 222. To simplify this disclosure, memory 220 is disclosed as a single logical block, but in a physical embodiment may include one or more blocks of any suitable volatile or non-volatile memory technology or technologies, including for example DDR RAM, SRAM, DRAM, cache, L1 or L2 memory, on-chip memory, registers, flash, ROM, optical media, virtual memory regions, magnetic or tape memory, or similar. In certain embodiments, memory 220 may comprise a relatively low-latency volatile main memory, while storage 250 may comprise a relatively higher-latency non-volatile memory. However, memory 220 and storage 250 need not be physically separate devices, and in some examples may represent simply a logical separation of function. It should also be noted that although DMA is disclosed by way of non-limiting example, DMA is not the only protocol consistent with this specification, and that other memory architectures are available. Similarly, L2 memory 320 is illustrated by way of example as a separate logical block. This is to illustrate certain features of the present specification, including the feature of NOC controller 272 brokering access to L2 memory 320 between the various masters shown according to an ordinal QoS scheme. However, in the general case, NOC controller 272 may broker access to any slave resource that is shared between various masters, including any addressable device or buffer.

Storage 250 may be any species of memory 220, or may be a separate device. Storage 250 may include one or more non-transitory computer-readable mediums, including by way of non-limiting example, a hard drive, solid-state drive, external storage, redundant array of independent disks (RAID), network-attached storage, optical storage, tape drive, backup system, cloud storage, or any combination of the foregoing. Storage 250 may be, or may include therein, a database or databases or data stored in other configurations, and may include a stored copy of operational software such as operating system 222 and software portions of QoS engine 502. Many other configurations are also possible, and are intended to be encompassed within the broad scope of this specification.

Network interface 260 may be provided to communicatively couple SoC 200 to a wired or wireless network. A "network," as used throughout this specification, may include any communicative platform operable to exchange data or information within or between computing devices, including by way of non-limiting example, an ad-hoc local network, an internet architecture providing computing devices with the ability to electronically interact, a plain old telephone system (POTS), which computing devices could use to perform transactions in which they may be assisted by human operators or in which they may manually key data into a telephone or other suitable electronic equipment, any packet data network (PDN) offering a communications interface or exchange between any two nodes in a system, or any local area network (LAN), metropolitan area network (MAN), wide area network (WAN), wireless local area network (WLAN), virtual private network (VPN), intranet, or any other appropriate architecture or system that facilitates communications in a network or telephonic environment.

Figure 3:
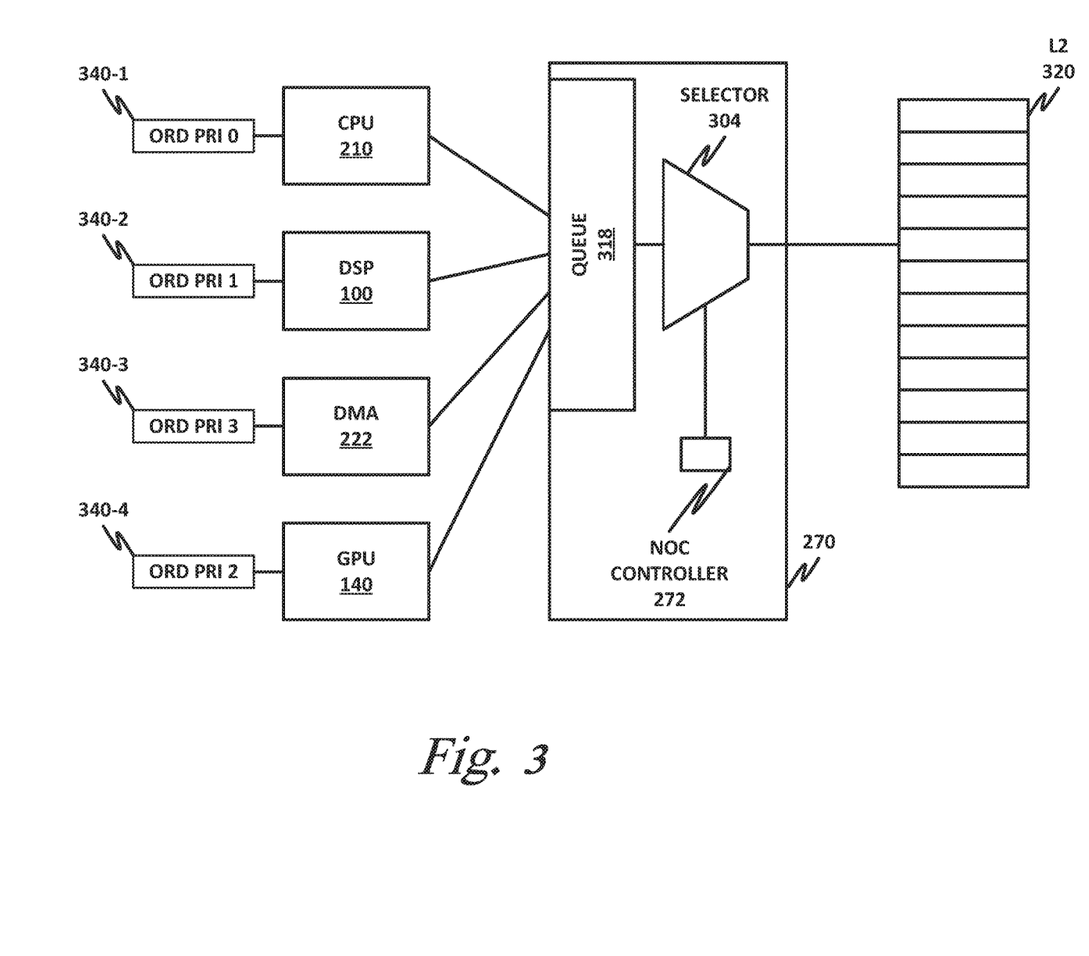
FIG. 3 is a block diagram of a plurality of selected elements of a SoC according to one or more examples of the present specification.

FIG. 3 is a block diagram of selected elements of an SoC 200 according to one or more examples of the present specification. The elements illustrated here are selected to illustrate a priority scheme. In this case, a number of masters are shown, including CPU 210, DSP 100, DMA 222, and GPU 140. Each of these communicatively couple to a slave, such as L2 memory 320, via NOC 270. Note that this specific implementation is provided as an illustrative and non-limiting example only. Any set of masters could be used, NOC 270 could be replaced with any suitable interconnect or bus, and L2 320 could be replaced with any slave device.

In this example, a NOC controller 272 is provided to control selector 304, which selects between the various masters and determines which will be serviced on the next cycle. In some cases, selector 304 or NOC 270 may include a queue 318 that holds a plurality of pending requests, each of which may have an associated QoS profile or QoS parameters that should be met. On or before each cycle that NOC 270 becomes available, NOC controller 272 examines pending requests in queue 318 and determines which is to be serviced next. Selector 304 then fetches the request from the queue and services the request.

In this example, each master has a QoS profile 340, namely CPU 210 has QoS profile 340-1, DSP 100 has QoS profile 340-2, DMA 222 has QoS profile 340-3, and GPU has QoS profile 340-4. QoS profiles 340 may be stored or encoded in any suitable location or by any suitable method, such as hardware encoding, firmware encoding, encoding in a register, encoding in a buffer, or in any other suitable location.

Here, each QoS profile 340 includes an ordinal priority value. In this case, the ordinal priority is a simple nonnegative integer value. Note that many other QoS factors may be encoded into QoS profiles 340, and the values shown here are an illustrative example only. In this case, CPU 210 has ordinal priority 0, DSP 100 has ordinal priority 1, DMA 222 has ordinal priority 3, and GPU 140 has ordinal priority 2. In other words, CPU 210 is considered the highest order master with the highest priority. DSP 100 has the next-highest ordinal priority. GPU 140 has the next-highest priority. And DMA 222 has the lowest priority of the masters depicted. Naturally, many other priority schemes are possible, and this one is shown as a non-limiting example only.

All else being equal, CPU 210 has first access to NOC 270. DSP 100 has second access to NOC 270. GPU 140 has third access to NOC 270. DMA 222 has fourth access to NOC 270. However, within queue 318, all else may not be equal. For example, a very old queued request from DMA 222 may get priority queueing over a very new request from CPU 210, particularly if DMA 222 has a QoS profile with a maximum acceptable latency, and that latency is in danger of not being met. Many other QoS factors may also play into queuing decisions made by NOC controller 272.

Figure 4:
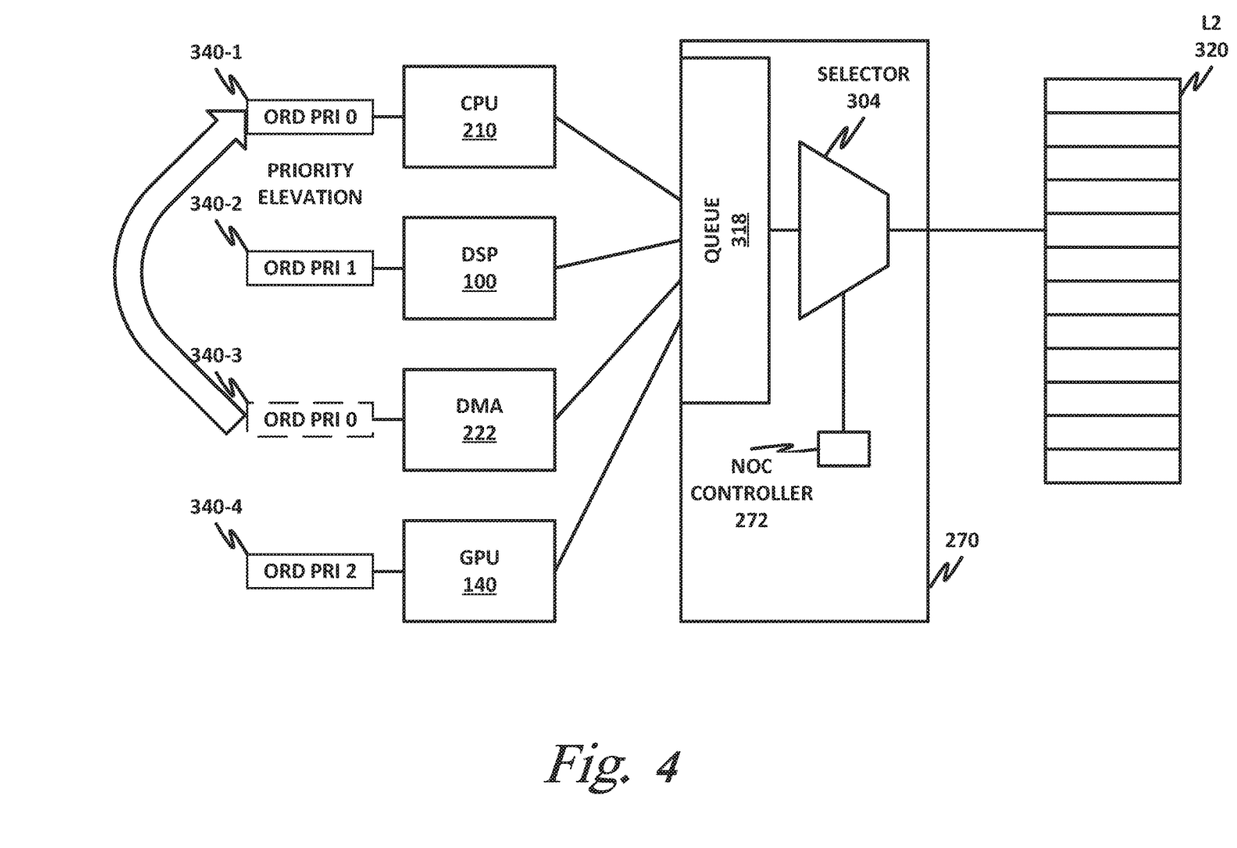
FIG. 4 is a block diagram of a plurality of selected elements of a SoC according to one or more examples of the present specification.

FIG. 4 is a block diagram of selected elements of an SoC 200 according to one or more examples of the present specification. This figure illustrates an ordinal priority elevation. According to the methods discussed herein, it is determined that DMA 222 needs a temporary ordinal priority elevation, for example to priority 0. Thus, DMA 222 is elevated to priority 0 so that CPU 210 can receive data that it needs to continue, such as for a time-sensitive operation. In some cases, the priority elevation is made a priori, so that when the request is queued in queue 318, it already has the elevated priority. In other examples, priority is elevated after the fact (such as when a QoS metric for CPU 210 is in danger of not being met). In that case, a QoS engine may need to notify NOC controller 272 of the elevated priority so that the request can be timely serviced.

Figure 5:
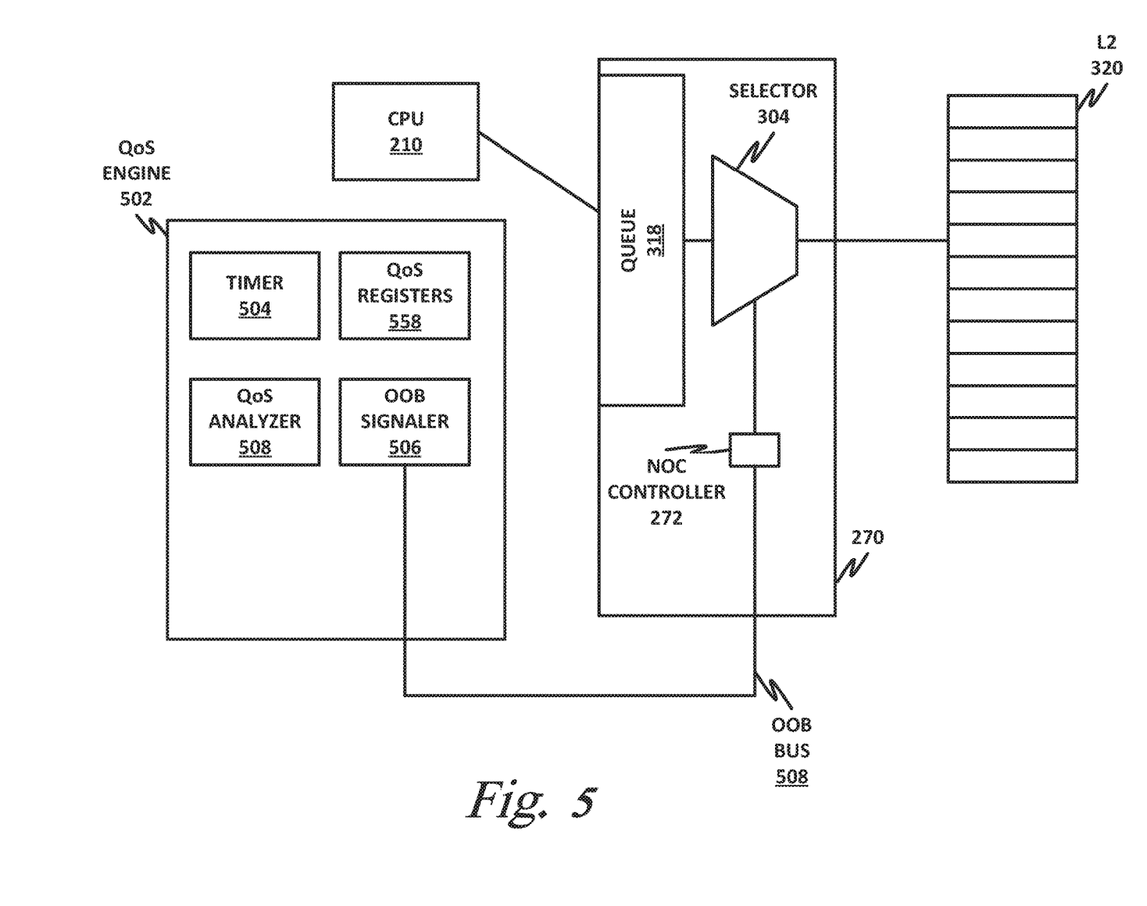
FIG. 5 is a block diagram of a plurality of selected elements of a SoC according to one or more examples of the present specification.

FIG. 5 is a block diagram of selected elements of an SoC 200 according to one or more examples of the present specification. In this example, a QoS engine 502 is illustrated. QoS engine 502 may include instructions, such as for example microcode or ROM instructions, that may be executed by CPU 210 (or alternately DSP 100) in one nonlimiting example. Note that in some embodiments, a single QoS engine 502 may be provided, while in other embodiments, each master may have its own full or partial QoS engine 502, and in other embodiments, functions may be divided between a dedicated QoS engine 502 and per-master QoS engines.

In this example, QoS engine 502 includes several logical blocks, which are defined here in terms of logical function rather than as specific or discrete hardware units. These include:

a. QoS Registers 558—Special purpose registers allocated for holding QoS values for various masters.

b. Timer 504—A timer to analyze the time that has passed since a particular request was issued. This may be used to analyze whether a particular request from a higher-order master is in danger of not being serviced within the acceptable QoS limit, possibly because it is waiting on a lower-order master.

c. QoS Analyzer 502 may be configured to automatically detect conditions that will benefit from adjustments to the QoS profile scheme, including ordinal priority elevation, including the optional ability to notify masters of the need to do so. QoS analyzer 508 may also be configured to automatically identify dependency between the second master (e.g., the DSP) and the first master (e.g., the DMA), and determine that a higher-order master is being forced to wait on a lower-order master, or that it is appropriate for the lower-order master to inherit the priority of the higher-order master.

d. Out of Band Signaler 506—In cases where QoS engine 502 is not able to handle QoS ordinal priority elevation internally (such as between masters), OOB signaler 506 may provide signals to NOC 270 via OOB bus 508. OOB signaling is provided as one example, but other mechanisms may be used, such as in-band signaling or interrupts.

QoS engine 502 may be embodied partly in one of the masters, such as a master that has sufficient system privileges to overwrite priority (e.g., CPU 210 or DSP 100), and may be aided by logic encoded as microcode instructions, instructions in a ROM, encoded in special-purpose hardware, or encoded in some other non-transitory computer-readable storage medium. In other embodiments, QoS engine 502 may be a separate hardware block that monitors the masters and performs the ordinal priority elevation as needed. In that case, the QoS hardware engine may be designed to have all of the privileges necessary to effect ordinal privilege elevation.

Many different mechanisms may be used for adjusting ordinal priority. For example, ordinal priority may be controlled or adjusted by QoS registers 558 or buffers. In that case, the original QoS profile is stored in the buffer or register. When ordinal priority elevation is required, the QoS profile for the affected master may be temporarily altered. In another embodiment, OOB signaling bus 508, which may include one or more wires, may be provided to signal the need for an ordinal priority elevation or other change to a QoS profile. In yet another example, an in-band adjustment signal may be sent to the NOC. In yet another example, an interrupt may be triggered to notify the NOC that a QoS profile change is needed. In yet another example, a master may have permission to change its own QoS profile. QoS profile changes may also apply just to the master in question, to other masters in the system, or the NOC itself. In yet another embodiment, QoS profiles may include one or more programmable values that may be set by application software. In some embodiments, the QoS profile may be reset to its default value before the start of the next transfer. To further expand on the signaling mechanism, there could be many different ways to signal the modifications to the transaction attributes. In another example, the first master sends a signal to a trigger unit that triggers modifications to one or more QoS profile registers in the second master. The new QoS profile can either reside in the second master itself (as a set of registers), or may be part of memory descriptor that gets loaded for a given data transfer to provide greater application control to the user.

QoS analyzer 508 may be configured to determine when it is appropriate to provide ordinal priority elevation. This could include, for example, explicit logic wherein DSP 100, for example, may expressly elevate the ordinal priority of DMA 222 upon retiring an instruction that will result in a DMA operation, where timing is sensitive and will be dependent upon DMA access to NOC 270. In another example, QoS engine 508 may include a heuristic engine that independently monitors all masters. QoS engine 508 may determine that DSP 100 has issued an instruction that is dependent on DMA 222, and that completion of the instruction is in danger of not being fulfilled within a latency threshold that may be part of the QoS profile for DSP 100. In that case, after waiting a sufficient time, (e.g., ¾ of the maximum latency), QoS engine 508 may immediately elevate the ordinal priority of DMA 222, optionally to a maximum or other optimal value, to ensure that the DSP request is fulfilled within the latency threshold. This latter method has the advantage that adjustments to the QoS scheme may be minimized, and are made only when a timing-critical function is in danger of not being fulfilled. In some embodiments, a user or programmer may have application-level visibility into the scheme, enabling the programmer to tag certain operations as timing-critical, and to optionally explicitly set latency thresholds for those operations, or even explicitly elevate the ordinal priority of DMA 222 in connection with a specific command.

QoS engine 502, in one example, is operable to carry out computer-implemented methods as described in this specification. QoS engine 502 may include one or more tangible non-transitory computer-readable mediums having stored thereon executable instructions operable to instruct a processor to provide a QoS engine 502. As used throughout this specification, an "engine" includes any combination of one or more logic elements, of similar or dissimilar species, operable for and configured to perform one or more methods provided by the engine. Thus, QoS engine 502 may comprise one or more logic elements configured to provide methods as disclosed in this specification. In some cases, QoS engine 502 may include a special integrated circuit or hardware circuit element designed to carry out a method or a part thereof, and may also include software or microcode instructions operable to instruct a processor to perform the method. In some cases, QoS engine 502 may run as a "daemon" process. A "daemon" may include any program or series of executable instructions, whether implemented in hardware, software, firmware, or any combination thereof that runs as a background process, a terminate-and-stay-resident program, a service, system extension, control panel, bootup procedure, BIOS subroutine, or any similar program that operates without direct user interaction. In certain embodiments, daemon processes may run with elevated privileges in a "driver space," or in ring 0, 1, or 2 in a protection ring architecture. It should also be noted that QoS engine 502 may also include other hardware and software, including configuration files, registry entries, and interactive or user-mode software by way of non-limiting example.

In one example, QoS engine 502 includes executable instructions stored on a non-transitory medium operable to perform a method according to this specification. The non-transitory medium may expressly include hardware-encoded logic or firmware, in addition to a medium encoding software instructions. At an appropriate time, such as upon booting SoC 200 or upon a command from the operating system or a user, the processor may retrieve a copy of the instructions from storage and load it into memory. The processor may then iteratively execute the instructions of QoS engine 502 to provide the desired method.

Figure 6:
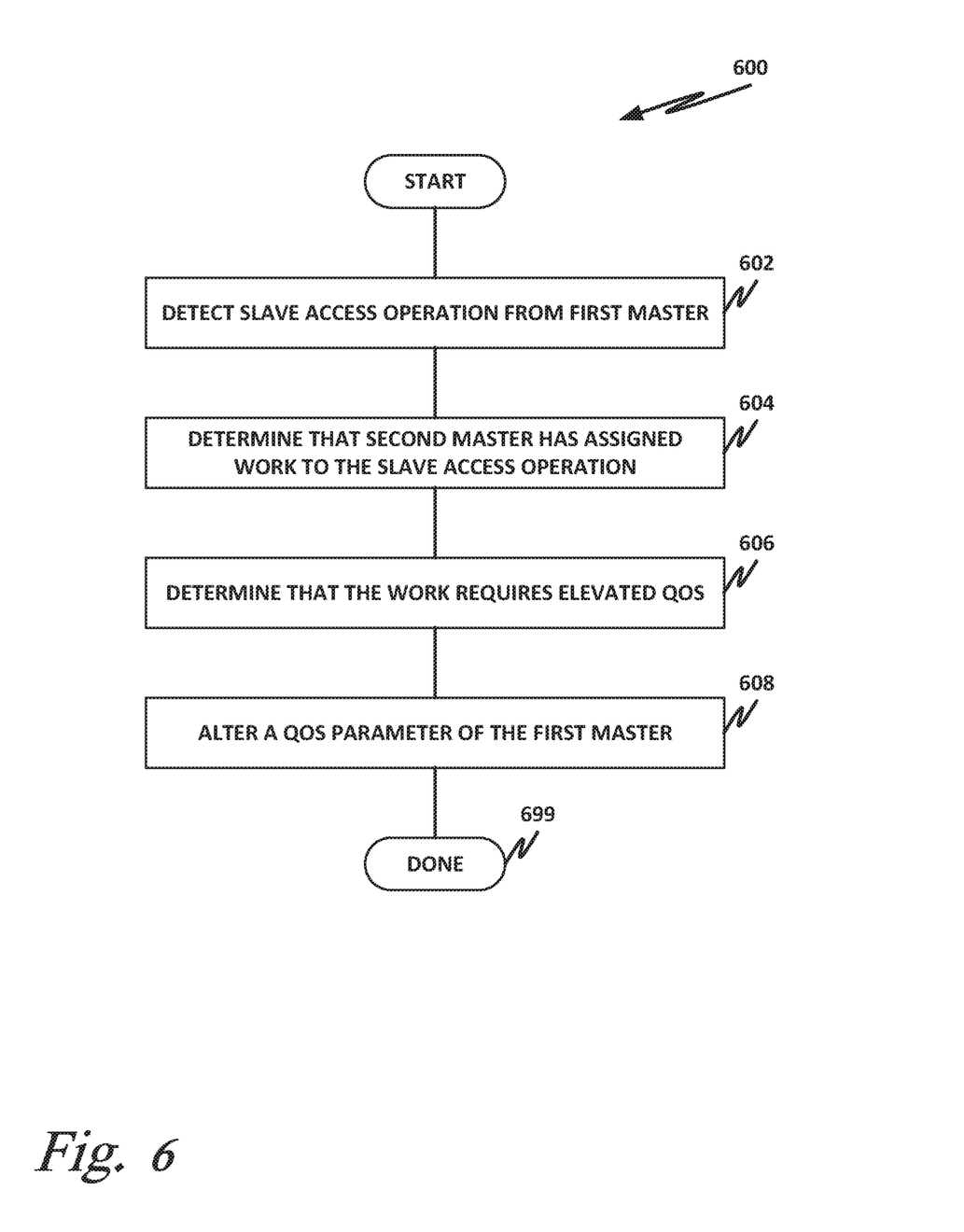
FIG. 6 is a flow chart of a method according to one or more examples of the present specification.

FIG. 6 is a flow chart of a method 600 of providing ordinal QoS priority elevation according to one or more examples of the present specification. This method may be performed by QoS engine 502.

In block 602, QoS engine 502 detects that a first master has initiated a slave access operation, such as DMA 222 accessing L2 memory 322 via NOC 270. Note that this "detection" could take the form of an independent QoS engine 502 detecting the operation, or of a QoS engine 502

(or part thereof) internal to a master taking note of the operation. Note that this may be an a priori notice, or it may be upon detecting a condition, such as that an operation is in danger of not completing within a QoS limit.

In block 604, QoS engine 502 determines that a second master has assigned work to the first master. For example, DSP 100 may have issued a memory request that requires DMA 222 to access NOC 270, and is waiting on results before it can continue with its operation.

In block 606, QoS engine 502 determines that the assigned work requires an elevated ordinal priority or other QoS parameter. This may be, for example, because the second master is waiting on the first master's results before it can proceed.

In block 608, QoS engine 502 alters one or more QoS parameters, such as an ordinal priority or one or more factors that affect ordinal priority. This effectively "promotes" the first master to a higher order for NOC access purposes, or alternately effectively allows the first master to "inherit" the priority of the second master so that it can timely achieve its task.

Note that the activities discussed above with reference to the FIGURES are applicable to any integrated circuits that involve signal processing (for example, gesture signal processing), particularly those that can execute specialized software programs or algorithms, some of which may be associated with processing digitized real-time data. Certain embodiments can relate to multi-DSP signal processing, floating point processing, signal/control processing, fixed-function processing, microcontroller applications, etc. In certain contexts, the features discussed herein can be applicable to medical systems, scientific instrumentation, wireless and wired communications, radar, industrial process control, audio and video equipment, current sensing, instrumentation (which can be highly precise), amateur radio, home automation, the "internet of things," and other digital-processing-based systems. Moreover, certain embodiments discussed above can be provisioned in digital signal processing technologies for medical imaging, patient monitoring, medical instrumentation, and home healthcare. This could include pulmonary monitors, accelerometers, heart rate monitors, pacemakers, etc. Other applications can involve automotive technologies for safety systems (e.g., stability control systems, driver assistance systems, braking systems, infotainment and interior applications of any kind). Furthermore, powertrain systems (for example, in hybrid and electric vehicles) can use high-precision data conversion products in battery monitoring, control systems, reporting controls, maintenance activities, etc. In yet other example scenarios, the teachings of the present disclosure can be applicable in the industrial markets that include process control systems that help drive productivity, energy efficiency, and reliability. In consumer applications, the teachings of the signal processing circuits discussed above can be used for image processing, auto focus, and image stabilization (e.g., for digital still cameras, camcorders, etc.). Other consumer applications can include audio and video processors for home theater systems, DVD recorders, and high-definition televisions. Yet other consumer applications can involve advanced touch screen controllers (e.g., for any type of portable media device). Hence, such technologies could readily part of smartphones, tablets, security systems, PCs, gaming technologies, virtual reality, simulation training, etc. All of the foregoing are provided by way of illustrative and nonlimiting example only. It should be appreciated that the teachings of this specification are broadly applicable to a wide range of technology areas.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

The particular embodiments of the present disclosure may readily include a system on chip (SOC), DSP, CPU, or similar package. An SOC represents an integrated circuit (IC) that integrates components of a computer or other electronic system into a single chip. It may contain digital, analog, mixed-signal, and radio frequency functions: all of which may be provided on a single chip substrate. Other embodiments may include a multi-chip-module (MCM), with a plurality of chips located within a single electronic package and configured to interact closely with each other through the electronic package. In various other embodiments, the digital signal processing functionalities may be implemented in one or more silicon cores in Application Specific Integrated Circuits (ASICs), Field Programmable Gate Arrays (FPGAs), and other semiconductor chips.

In example implementations, at least some portions of the processing activities outlined herein may also be implemented in software. In some embodiments, one or more of these features may be implemented in hardware provided external to the elements of the disclosed figures, or consolidated in any appropriate manner to achieve the intended functionality. The various components may include software (or reciprocating software) that can coordinate in order to achieve the operations as outlined herein. In still other embodiments, these elements may include any suitable algorithms, hardware, software, components, modules, interfaces, or objects that facilitate the operations thereof.

Additionally, some of the components associated with described processors may be removed, or otherwise consolidated. In a general sense, the arrangements depicted in the figures may be more logical in their representations, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, equipment options, etc.

Any suitably-configured processor component can execute any type of instructions associated with the data to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof. In operation, processors may store information in any suitable type of non-transitory storage medium (for example, random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. Further, the information being tracked, sent, received, or stored in a processor could be provided in any database, register, table, cache, queue, control list, or storage structure, based on particular needs and implementations, all of which could be referenced in any suitable timeframe. Any of the memory items discussed herein should be construed as being encompassed within the broad term 'memory.' Similarly, any of the potential processing elements, modules, and machines described herein should be construed as being encompassed within the broad terms "microprocessor," "digital signal processor," or "processor." Furthermore, in various embodiments, the processors, memories, network cards, buses, storage devices, related peripherals, and other hardware elements described herein may be realized by a processor, memory, and other related devices configured by software or firmware to emulate or virtualize the functions of those hardware elements.

Computer program logic implementing all or part of the functionality described herein is embodied in various forms, including, but in no way limited to, a source code form, a computer executable form, and various intermediate forms (for example, forms generated by an assembler, compiler, linker, or locator). In an example, source code includes a series of computer program instructions implemented in various programming languages, such as an object code, an assembly language, or a high-level language such as OpenCL, Fortran, C, C++, JAVA, or HTML for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

In the discussions of the embodiments above, any capacitors, buffers, graphics elements, interconnect boards, clocks, DDRs, camera sensors, dividers, inductors, resistors, amplifiers, switches, digital core, transistors, and/or other components can readily be replaced, substituted, or otherwise modified in order to accommodate particular circuitry needs. Moreover, it should be noted that the use of complementary electronic devices, hardware, non-transitory software, etc. offer an equally viable option for implementing the teachings of the present disclosure.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In another example embodiment, the electrical circuits of the FIGURES may be implemented as stand-alone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

By way of example, there is disclosed a computing apparatus, comprising: a first master having a first ordinal quality of service (QoS) profile; a second master having a second ordinal QoS profile, wherein the second ordinal QoS profile is higher in order than the first ordinal QoS profile; a slave; a multiplexed interconnect to communicatively couple the first master and second master to the slave according to the first ordinal QoS profile and second ordinal QoS profile; and one or more logic elements, including at least one hardware logic element, comprising a QoS engine to: determine that the first master has initiated a slave operation via the interconnect; determine that completing the slave operation according to a QoS criterion provided by the second master requires elevated QoS; and promote the first master to a third ordinal QoS profile having an order higher than the second ordinal QoS profile.

There is further disclosed an example, wherein the third ordinal QoS profile is of the same order as the second ordinal QoS profile.

There is further disclosed an example, wherein the third ordinal QoS profile is of an order higher than the first ordinal QoS profile and lower than the second ordinal QoS profile.

There is further disclosed an example, wherein determining that completing the slave operation according to the QoS criterion provided by the second master requires elevated QoS comprises determining that the slave operation is in danger of not completing within a deadline.

There is further disclosed an example, wherein the deadline is provided by the second master.

There is further disclosed an example, wherein the deadline is selected from the group consisting of a number of processor cycles, a fixed time window, or an immediate trigger.

There is further disclosed an example, wherein promoting the first master to the third ordinal QoS profile comprises the second master explicitly assigning the third ordinal QoS profile to the first master.

There is further disclosed an example, wherein assigning the third ordinal QoS profile to the first master comprises notifying the interconnect of the third ordinal QoS profile.

There is further disclosed an example, wherein notifying the interconnect comprises providing a signal via an out-of-band bus.

There is further disclosed an example, wherein notifying the interconnect comprises writing to a register.

There is further disclosed an example, wherein notifying the interconnect comprises triggering an interrupt.

There is further disclosed an example of system-on-a-chip (SoC), comprising: a first master having a first ordinal quality of service (QoS) profile; a second master having a second ordinal QoS profile, wherein the second ordinal QoS profile is higher in order than the first ordinal QoS profile; a slave; a network on a chip (NOC) to communicatively couple the first master and second master, the NOC comprising a NOC controller to provide access priority according to the first ordinal QoS profile and second ordinal QoS profile; and an on-chip QoS engine to: determine that the first master has initiated a slave operation via the interconnect; determine that completing the slave operation according to a QoS criterion provided by the second master requires elevated QoS; and promote the first master to a third ordinal QoS profile having an order higher than the second ordinal QoS profile.

There is further disclosed an example, wherein determining that completing the slave operation according to the QoS criterion provided by the second master requires elevated QoS comprises determining that the slave operation is in danger of not completing within a deadline.

There is further disclosed an example, wherein the second master is to explicitly assign the third ordinal QoS profile to the first master.

There is further disclosed an example, further comprising a QoS register to receive the third ordinal QoS profile.

There is further disclosed an example of a method of providing quality of service (QoS) ordinal elevation for a computing system having a first master with a first ordinal QoS profile, a second master having a second ordinal QoS profile, and a multiplexed interconnect to communicatively couple the first master and second master to a slave resource with a priority according to the ordinal QoS profiles, comprising: determining that the first master has initiated a slave operation via the interconnect; determining that completing the slave operation according to a QoS criterion provided by the second master requires elevated QoS; and promoting the first master to a third ordinal QoS profile having an order higher than the second ordinal QoS profile.

There is further disclosed an example, wherein the third ordinal QoS profile is of the same order as the second ordinal QoS profile.

There is further disclosed an example, wherein the third ordinal QoS profile is of an order higher than the first ordinal QoS profile and lower than the second ordinal QoS profile.

There is further disclosed an example, wherein determining that completing the slave operation according to the QoS criterion provided by the second master requires elevated QoS comprises determining that the slave operation is in danger of not completing within a deadline.

There is further disclosed an example, wherein promoting the first master to the third ordinal QoS profile comprises the second master explicitly assigning the third ordinal QoS profile to the first master.

There is further disclosed an example of a method of providing the QoS engine of any of the preceding examples.

There is further disclosed an example of an apparatus comprising means for performing the method.

There is further disclosed an example wherein the means comprise a system on a chip.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke subsection (f) of 35 U.S.C. section 112 as it exists on the date of the filing hereof unless the words "means for" or "steps for" are specifically used in the particular claims; and (b) does not intend, by any statement in the specification, to limit this disclosure in any way that is not otherwise reflected in the appended claims.

What is claimed is:

1. A computing apparatus, comprising:
   a first master having a first ordinal quality of service (QoS) profile;
   a second master having a second ordinal QoS profile, wherein the second ordinal QoS profile is higher in order than the first ordinal QoS profile;
   a slave;
   a multiplexed interconnect to communicatively couple the first master and second master to the slave with a priority according to the ordinal QoS profiles; and
   a QoS engine to:
   determine that the first master has initiated a slave operation via the interconnect;
   receive from the second master a message that the first master is to inherit priority from the second master; and
   promote the first master to a third ordinal QoS profile having an order higher than or equal to the second ordinal QoS profile.

2. The computing apparatus of claim 1, wherein the third ordinal QoS profile is of the same order as the second ordinal QoS profile.

3. The computing apparatus of claim 1, wherein the third ordinal QoS profile is of an order higher than the first ordinal QoS profile and lower than the second ordinal QoS profile.

4. The computing apparatus of claim 1, wherein receiving from the second master a message that the first master is to inherit priority from the second master comprises determining that the slave operation is in danger of not completing within a deadline.

5. The computing apparatus of claim 4, wherein the deadline is provided by the second master.

6. The computing apparatus of claim 4, wherein the deadline is selected from the group consisting of a number of processor cycles, a fixed time window, or an immediate trigger.

7. The computing apparatus of claim 1, wherein the message comprises a notification to the interconnect of the third ordinal QoS profile.

8. The computing apparatus of claim 1, wherein the message comprises a signal via an out-of-band bus.

9. The computing apparatus of claim 1, wherein the message comprises a value written to a register.

10. The computing apparatus of claim 1, wherein the message comprises an interrupt.

11. The computing apparatus of claim 1, wherein the message comprises a signal provided concurrently with a transaction that the second ordinal QoS profile applies to.

12. The computing apparatus of claim 1, wherein the message comprises a notification to the slave.

13. A system-on-a-chip (SoC), comprising:
a first master having a first ordinal quality of service (QoS) profile;
a second master having a second ordinal QoS profile, wherein the second ordinal QoS profile is higher in order than the first ordinal QoS profile;
a slave;
a network on a chip (NOC) to communicatively couple the first master and second master, the NOC comprising a NOC controller to provide access priority according to the ordinal QoS profiles; and
an on-chip QoS engine to:
determine that the first master has initiated a slave operation via the interconnect;
receive from the second master a message that the first master is to inherit priority from the second master; and
promote the first master to a third ordinal QoS profile having an order higher than or equal to the second ordinal QoS profile.

14. The SoC of claim 13, wherein receiving from the second master a message that the first master is to inherit priority from the second master comprises determining that the slave operation is in danger of not completing within a deadline.

15. The SoC of claim 13, further comprising a QoS register to receive the third ordinal QoS profile.

16. A method of providing quality of service (QoS) ordinal elevation for a computing system, comprising:
communicatively coupling a first master with a first ordinal QoS profile and a second master with a second ordinal QoS profile to a slave resource via a multiplexed interconnect;
determining that the first master has initiated a slave operation via the interconnect;
receiving from the second master a message that the first master is to inherit priority from the second master; and
promoting the first master to a third ordinal QoS profile having an order higher than or equal to the second ordinal QoS profile.

17. The method of claim 16, wherein the third ordinal QoS profile is of the same order as the second ordinal QoS profile.

18. The method of claim 16, wherein the third ordinal QoS profile is of an order higher than the first ordinal QoS profile and lower than the second ordinal QoS profile.

19. The method of claim 16, wherein receiving from the second master a message that the first master is to inherit priority from the second master comprises determining that the slave operation is in danger of not completing within a deadline.

* * * * *